(12) United States Patent
Danilov et al.

(10) Patent No.: US 10,845,991 B2
(45) Date of Patent: Nov. 24, 2020

(54) SHALLOW MEMORY TABLE FOR DATA STORAGE SERVICE

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 66 days.

(21) Appl. No.: 16/207,398

(22) Filed: Dec. 3, 2018

(65) Prior Publication Data

US 2020/0174665 A1 Jun. 4, 2020

(51) Int. Cl.
*G06F 3/06* (2006.01)

(52) U.S. Cl.
CPC .......... *G06F 3/0604* (2013.01); *G06F 3/0619* (2013.01); *G06F 3/0646* (2013.01); *G06F 3/0679* (2013.01)

(58) Field of Classification Search
CPC ............... G06F 3/0679; G06F 11/2023; G06F 11/2071; G06F 12/0292; G06F 16/23; G06F 3/0685; G06F 11/1471; G06F 2212/205; G06F 3/0619; G06F 11/1469; G06F 16/9027; G06F 3/0604; G06F 3/0646
USPC .......................................................... 711/162
See application file for complete search history.

(56) References Cited

U.S. PATENT DOCUMENTS

| | | | | |
|---|---|---|---|---|
| 2014/0082261 A1* | 3/2014 | Cohen | ............... | G11C 16/06 711/103 |
| 2015/0142817 A1* | 5/2015 | Zheng | .................. | G06F 3/0685 707/741 |
| 2016/0077744 A1* | 3/2016 | Pundir | ................. | G06F 3/0608 711/103 |

\* cited by examiner

*Primary Examiner* — Hashem Farrokh
(74) *Attorney, Agent, or Firm* — Amin, Turocy & Watson, LLP

(57) ABSTRACT

The technology describes shallow memory tables, comprising data maintained at a backup node of a data storage system that contain digest information related to a main node memory table that represents a metadata tree. If the main node fails, the shallow memory table's digest information contains sufficient information to recover the failed main node's memory table data. In response to receiving an update operation at a main node, the main node updates a memory table, journals an update record in a tree-related journal, and sends a digest representing the update to a backup node, which maintains the digest in a shallow memory table. If the main node fails, the backup node transforms the shallow memory table into a memory table by using the digest information to locate the corresponding update journal records. The backup node is able to handle create, read, update and delete requests during the transformation.

20 Claims, 16 Drawing Sheets

SHALLOW MEMORY TABLE FOR DATA STORAGE SERVICE

TECHNICAL FIELD

The subject application generally relates to data storage, and, for example, to a data storage system of nodes that provides system availability after a node failure, and related embodiments.

BACKGROUND

Contemporary cloud-based data storage systems, such as ECS (formerly known as ELASTIC CLOUD STORAGE) provided by DELL EMC, can be based on a cluster of nodes that each own some part of the stored data (and can store redundant data owned by other nodes for data protection purposes). For example, user data can be stored in a repository and the metadata associated with the user data stored in search trees owned by a given node.

Trees are maintained in non-volatile memory, and to save on the resource cost of data updates, ECS implements bulk tree updates. More particularly, when an update operation occurs, information about the operation goes into a tree journal as a journal record, also maintained in non-volatile memory.

For efficiency in serving update requests, a node that owns a tree keeps an effective state of the tree (which takes into account the tree's data and updates thereto in the tree's journal) in a memory table in fast, volatile memory. Eventually when space is needed (based on a total combined footprint of a node's memory tables), a node dumps its memory tables into non-volatile storage, with each memory table dumped as a new version of the corresponding tree.

A problem occurs when the node that owns memory tables fails. When a node fails, one or more other nodes (which can correspond to a zone) need to create new memory tables for the trees that the failed node used to own. Creation of a memory table for a tree implies a search for a new owner of the tree, reading tree parts, searching for the tree's journal, and parsing and replaying journal entries. This increases the load on remaining nodes; moreover, creation of new memory tables in a node increases that node's total footprint size, which can causes bursts of memory table dumps. With contemporary clusters, recovery of memory tables after a sudden node shutdown takes on the order of five minutes, during which time a significant (and sometimes major) part of client requests are rejected.

One attempt to mitigate this problem uses shadow memory tables, in which a shadow (backup) memory table is maintained at another node for each memory table owned by a node. For any update received at a node, the node maintains information about the update in its appropriate memory table, which also goes to the appropriate tree's journal. The backup node replays the tree's journal to update the shadow memory table.

Using shadow memory tables is thus one way to solve the problem of system availability after a node shutdown. However, shadow memory tables have too severe of an impact on data storage systems during normal conditions to be of practical use. For one, the use of shadow memory tables doubles the accumulated footprint of all the memory tables in a system, whereby each particular memory table needs to be halved in size; however smaller memory tables cause more frequent creation of new tree versions, and reduce efficiency of a memory table in tree read cache. Further, the journal replay operations needed to update a shadow memory table significantly increases I/O workload, and moreover, the needed journal parsing operations have proven to be an even more significant problem than the extra I/O workload.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
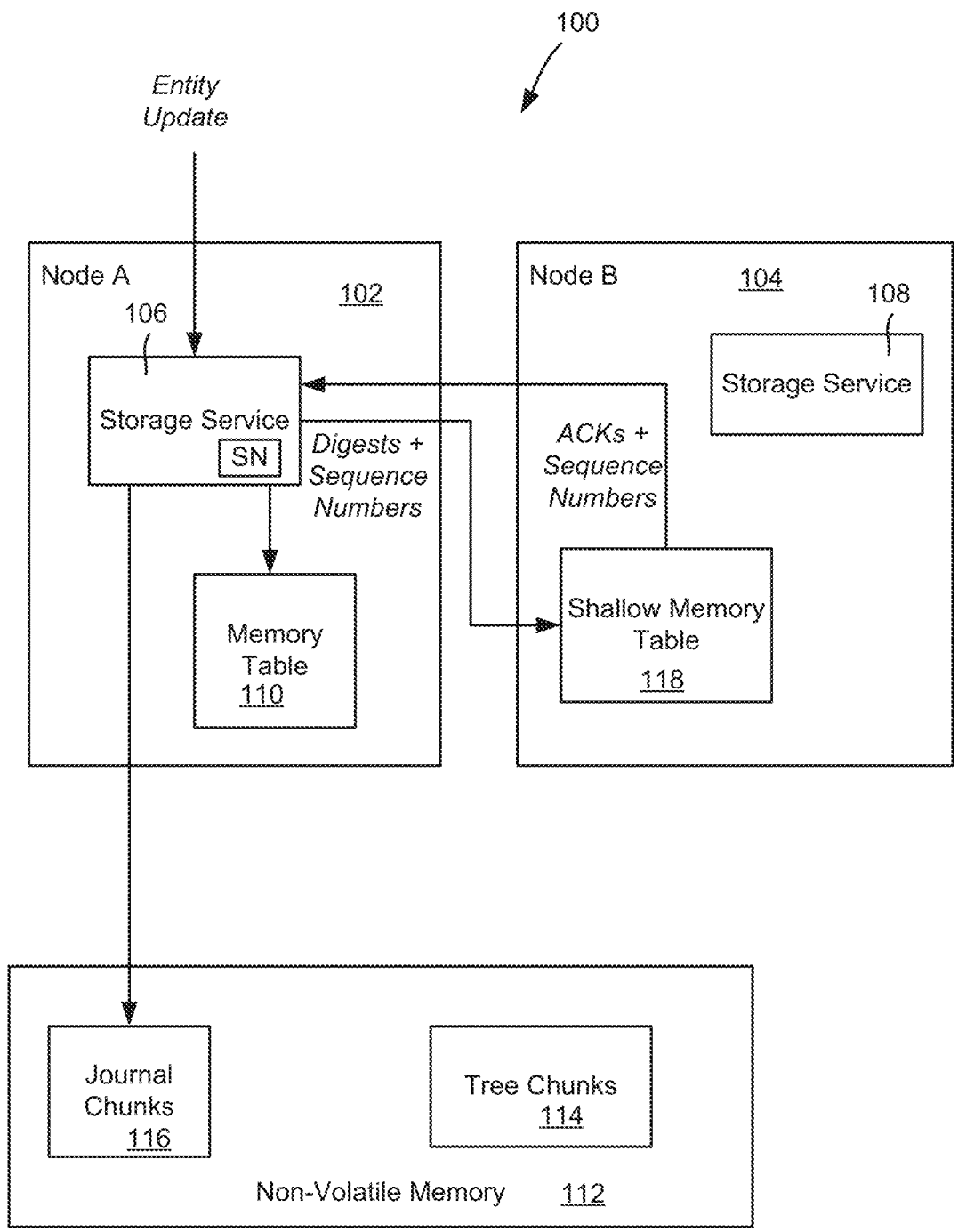
FIG. 1 is an example block diagram representation of part of a data storage system including nodes, in which a main node maintains a memory table and a backup node maintains a shallow memory table correspond to the memory table, in accordance with various aspects and implementations of the subject disclosure.

Various aspects of the technology described herein are generally directed towards shallow memory tables, in which a shallow memory table provides a solution to the problem of low system availability when a node fails, without significant impact on data storage systems during normal operating conditions. In general, a shallow memory table is implemented in one node (a backup node) as a backup device for another node (a main node). The shallow memory table does not directly back up a main node's memory table, but rather contains significantly less data, namely the data needed to recreate the main node's memory table if the main node fails. In this way, the backup node becomes a new main node with respect to data formerly owned by the (now failed) main node.

Moreover, as will be understood, when a main node fails, the shallow memory table in the backup node is transformed into a new memory table. During the transformation process, create, read, update and delete requests corresponding to the former, now failed main node can be serviced by the backup node, (although in a somewhat degraded node until the transformation process is complete and the backup node becomes the new main node for the data).

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As will be understood, the implementation(s) described herein are non-limiting examples, and variations to the technology can be implemented. For instance, examples are based on the ECS data storage system, however the technology described herein can be used by any data storage system that has multiple nodes. As such, any of the embodiments, aspects, concepts, structures, functionalities, implementations and/or examples described herein are non-limiting, and the technology may be used in various ways that provide benefits and advantages in data storage technology in general.

Aspects of the subject disclosure will now be described more fully hereinafter with reference to the accompanying drawings in which example components and operations are shown, and wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. Thus, the subject disclosure may be embodied in many different forms and should not be construed as limited to the examples set forth herein.

In ECS, disk space is partitioned into a set of blocks of fixed size called chunks. The various types of data, including user data and various types of metadata, are stored in chunks. There are different types of chunks, one type per capacity user. In particular, user data is stored in repository chunks, while the metadata is stored in directory tables, where each directory table is a set of key-value search trees. These search trees are stored in tree chunks. Each search tree has a journal of updates, with tree journals stored in journal chunks.

Chunks of each type can be shared. For instance, one repository chunk may contain segments of several user objects, one tree chunk may contain elements of several trees, and so on.

In one or more implementations, each directory table comprises 128 trees. Each tree is owned by one cluster node and there is a hash function that distributes trees of each directory table between the nodes.

ECS implements bulk tree updates in order to minimize the total cost of updates. A node, which owns a tree, keeps an effective state of the tree (the state, which takes into account the tree's journal) in a volatile memory referred to as a memory table (also referred to herein as a memory table of full value). As can be understood, having a considerable part of a search tree in a memory table in fast volatile storage significantly speeds up access to metadata. However, because the memory table is in volatile storage, as set forth above, problems occur when the node that contains the memory table fails.

Memory tables in ECS are relatively large, comprising gigabytes of volatile memory. When the accumulated footprint of all memory tables owned by a node owns exceeds the amount of volatile memory reserved for them, the node dumps the memory tables to a non-volatile memory. Each memory table is dumped as a new version of the corresponding tree. Note that because of the large size of the memory tables, new tree versions are created not that often.

FIG. 1 shows part of a cloud data storage system 100 such as ECS in which two nodes are shown, node A 102 and node B 104. Among its services, a node such as the node 102 contains a storage service 106 that receive updates to entities (e.g., data objects) managed by the respective node 102. The node B 104 is also shown as having a storage service 108.

In a typical update operation, an entity update for an entity managed by the node A (a main node for this entity) is handled by the storage service 106, which modifies a corresponding memory table 110 based on the update. As described herein, the memory table 110 corresponds to the current state of the search tree of entity metadata, including updates.

The storage service 106 also persists the update in non-volatile memory 112. For efficiency, instead of modifying the search tree of metadata (maintained in tree chunks 114) based on the update, the update is journaled to a journal record (maintained in journal chunks 116); when needed, the search tree can be updated using the journal records to modify the tree into the actual current tree state.

As described herein, an entity update operation is further communicated (in part) to a backup node, which in the example of FIG. 1 is the node B 104. The node B 104 maintains a shallow memory table as described herein (block 118, which includes a manager component that maintains the shallow memory table).

As described herein, the shallow memory table (block 118) saves partial information regarding the update, with the partial information referred to as a digest. In general, a digest comprises a key-digest pair that contains the information needed to locate the journal record for the update, (e.g., journal chunk identifier plus offset for the relevant record) and is thus typically only a relatively very small amount of information relative to the full value maintained as a key-value pair in the memory table 110. Note that as described herein, to ensure a level of consistency between a main memory table 110 and its corresponding shallow memory table (block 118), the digest can be associated with a sequence number via a sequence number device SN coupled to the storage service, and returned with an acknowledgement.

To summarize, the general content of shallow memory tables comprises a key-value map of digests of tree updates. A key corresponds to a tree key, digest value corresponds to a location of an update within journal chunks. Note that if there are multiple updates for a single key, a digest value can correspond to a list of updates.

A shallow memory table also keeps a tree root. Note that a shallow memory table does not get update digests and root updates from general sources of information like journals and shared cluster memory, but rather, the information for the shallow memory comes directly from a node that owns a tree. When another update comes to a node to handle, the node stores the update to journal, updates its local memory table and sends the digest for the update to the node that maintains shallow memory table for the tree. When a new version is created for the tree, the new root is also sent to the backup node. Upon receiving a new tree root, a shallow memory table clears its key-value map of update digests.

As described herein, if needed, e.g., upon failure of a main node, a key-digest pair is transformed to a key-value pair, as maintained in a memory table of full value. To this end, the digest is used to discover the complete description of the tree update (e.g. in the corresponding journal). Note however that in one or more implementations, a digest can further comprise information regarding the type of update (e.g., create/update/delete) that occurred. This additional information can be used to optimize user traffic handling during transformation of a shallow memory table to a memory table of a full value, as described herein.

Figure 2:
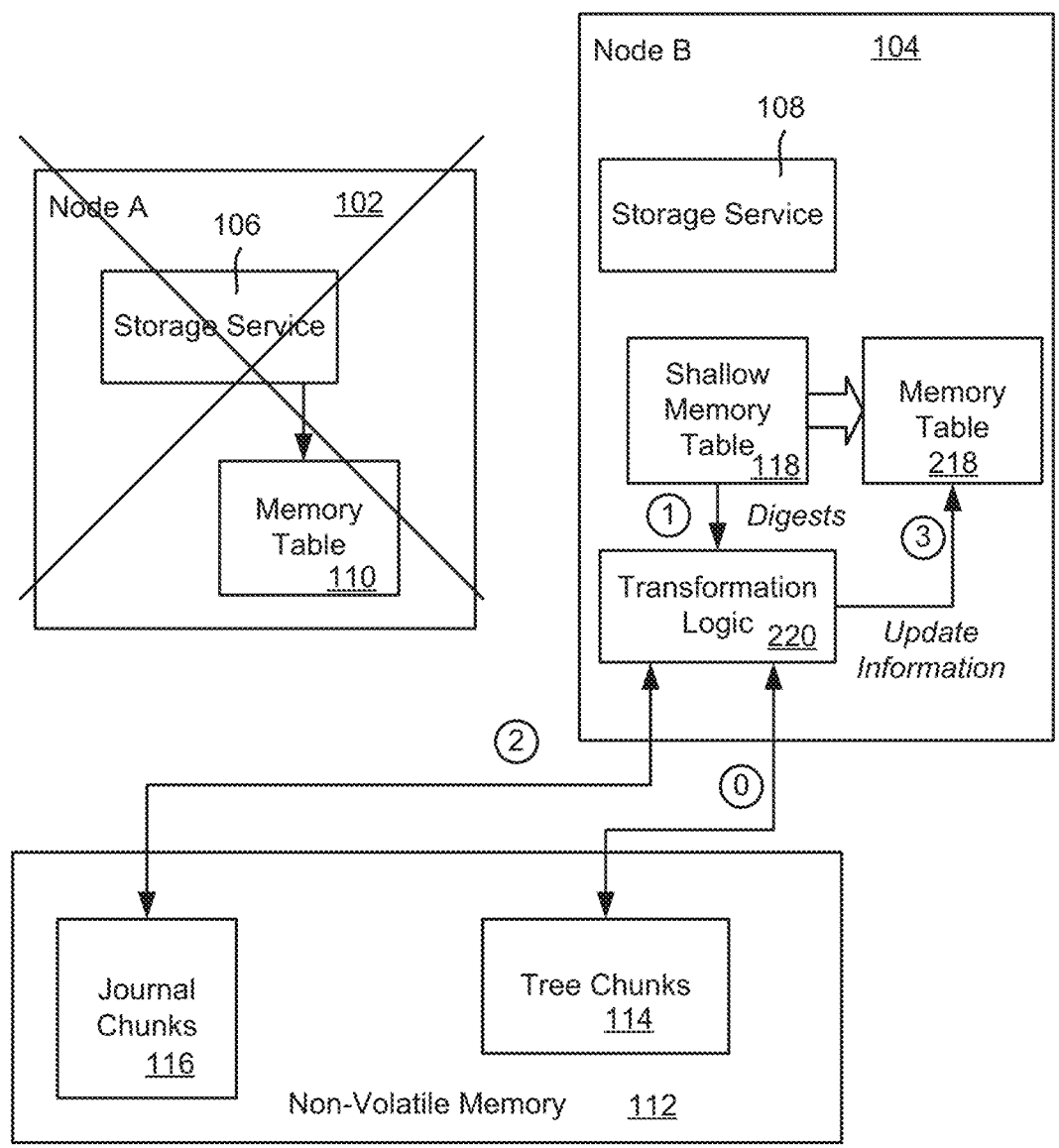
FIG. 2 is an example block diagram representation of part of a data storage system including nodes, in which a main node that maintains a memory table fails, and a backup node uses a shallow memory table to recover from the failure of the main node, in accordance with various aspects and implementations of the subject disclosure.

More particularly, as represented in FIG. 2, if there is a node failure, the digest information can be used to transform a shallow memory table to a normal memory table. Moreover, as described herein, a shallow memory table can virtually immediately serve requests directed to a tree (albeit with some performance degradation during recovery, e.g., on the order of minutes, after a node failure). Thus, shallow memory tables provide a solution to low system availability that otherwise occurs after a node failure, but without severe impact on systems during normal operating conditions.

As represented in FIG. 2, after a node 102 that owns some tree fails, its backup node 104 (the node that maintains a shallow memory table for the tree) becomes a new owner of the tree. As a tree owner, the node 104 transforms the shallow memory table (block 118) into a full value memory table 218. The transformation logic 220 provides a process in which the node 104 uses the tree root it has to get access to tree nodes and key-value pairs the tree contains, e.g., from the tree chunks 114 as represented in FIG. 2 via the arrow labeled zero (0). As represented by the arrows labeled one (1) to three (3), the transformation logic 220 iterates over the update digests that the shallow memory table contains, reads each update from the journal chunks 116, and replaces the digests with actual update information.

As represented in FIG. 2, after node failure handling is complete, a new backup node 330 (node C in FIG. 3) may be chosen for the tree. Then, the new owner (node B 104) may create a new tree version and send it to the backup node 330 to initialize a new shallow memory table 318 for the tree.

Node failure handling with shallow memory tables is faster than node failure handling without them. For one, there is no need to negotiate at the cluster level regarding new tree owners. Further, a backup node may commence failure handling right away. Still further, there is no need to find updates for the tree, as the key information about the updates (that is, the digests) is already maintained in a shallow memory table. Although complete handling of a node failure may be on the order of minutes, with shallow memory tables there are no system availability issues during node failure handling.

Figure 4:
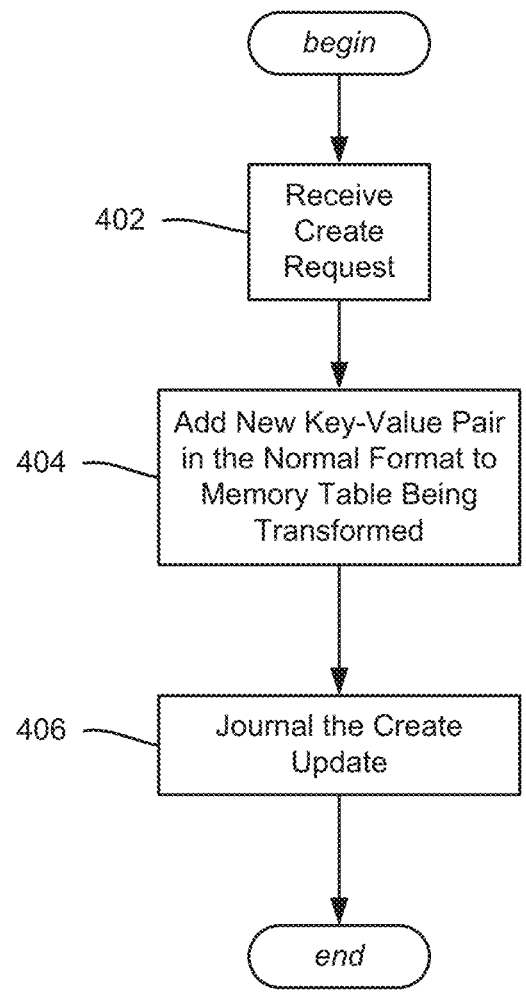
FIG. 4 is a flow diagram showing example operations of a backup node that handles a create request received while transforming a shallow memory table to a regular memory table, in accordance with various aspects and implementations of the subject disclosure.

More particularly, CRUD (Create/Read/Update/Delete) requests can be serviced during node failure handling, including while there is only a shallow memory table available, e.g., when a shallow memory table just has started to be transformed into a normal memory table. With respect to create requests, as is understood, create requests imply creation of a new key. For such a request, as represented via operations 402 and 404 of FIG. 4, a memory table (including one being transformed from a shallow memory table) adds a key-value pair in the normal format, that is, as a complete key-value pair entry, not in the form of a digest. Note that the create request/resulting update is still journaled as an update to non-volatile memory, as represented by operation 406.

Figure 5:
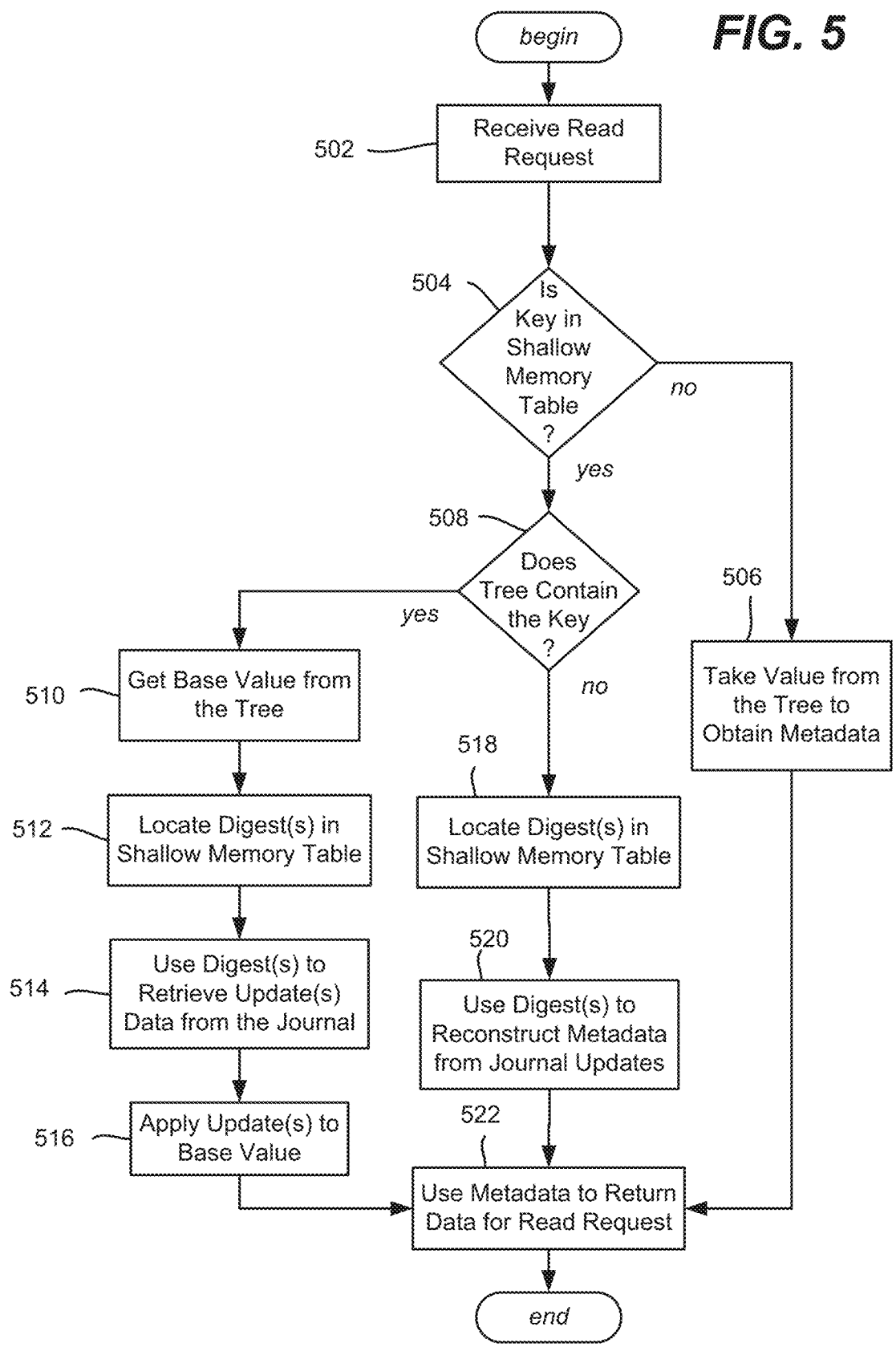
FIG. 5 is a flow diagram showing example operations of a backup node that handles a read request received while transforming a shallow memory table to a regular memory table, in accordance with various aspects and implementations of the subject disclosure.

The handling of a read request during a transformation of a shallow memory table to a memory table of full value is represented in FIG. 5, in which operation 502 represents receiving a read request. Note that if the read request corresponds to an already-transformed key-value pair of full value, the value (metadata) can be used to service the read request; the operations of FIG. 5 are for when this has not yet occurred.

Operation 504 represents evaluating whether a key corresponding to the read request is in the shallow memory table corresponding to that entity. If not, there have been no updates to the information in the tree, and the value (the metadata needed to service the read request at operation 522) is taken directly from the tree using the tree root that is available as an entry point.

If instead the key is in the shallow memory table, at operation 508 the read request handling performs a lookup in the tree to see if the tree contains the key; note that an entity may have been created such that one or more journaled updates may exist since a new version of the tree was last created (or the tree was otherwise bulk updated from the tree journal), and thus the tree does not contain the key.

If the tree contains the key, the base value is taken from the tree as represented by operation 510. Then, using the one or more update digests (operation 512) that reside the shallow memory table, information about the one or more updates is retrieved from the journal (operation 514), and one or multiple updates are applied to the base value (operation 516). This provides the metadata that can be used to service the read request (operation 522).

If the tree does not contain the key as evaluated at operation 508, the value to return needs to be reconstructed from the available updates available. Using the updates digest(s) located via operation 518, information about the one or more updates is retrieved from the journal (operation 520), and used to reconstruct the full value/metadata (operation 520). This provides the metadata that can be used to service the read request (operation 522).

Note that although not shown in FIG. 5, the metadata, once taken from the tree and/or updated/reconstructed from updates, can be used by the transformation logic/process. That is, the current value of the key, value pair is now obtained, and can be saved in the memory table to represent the current state of the tree.

Figure 6:
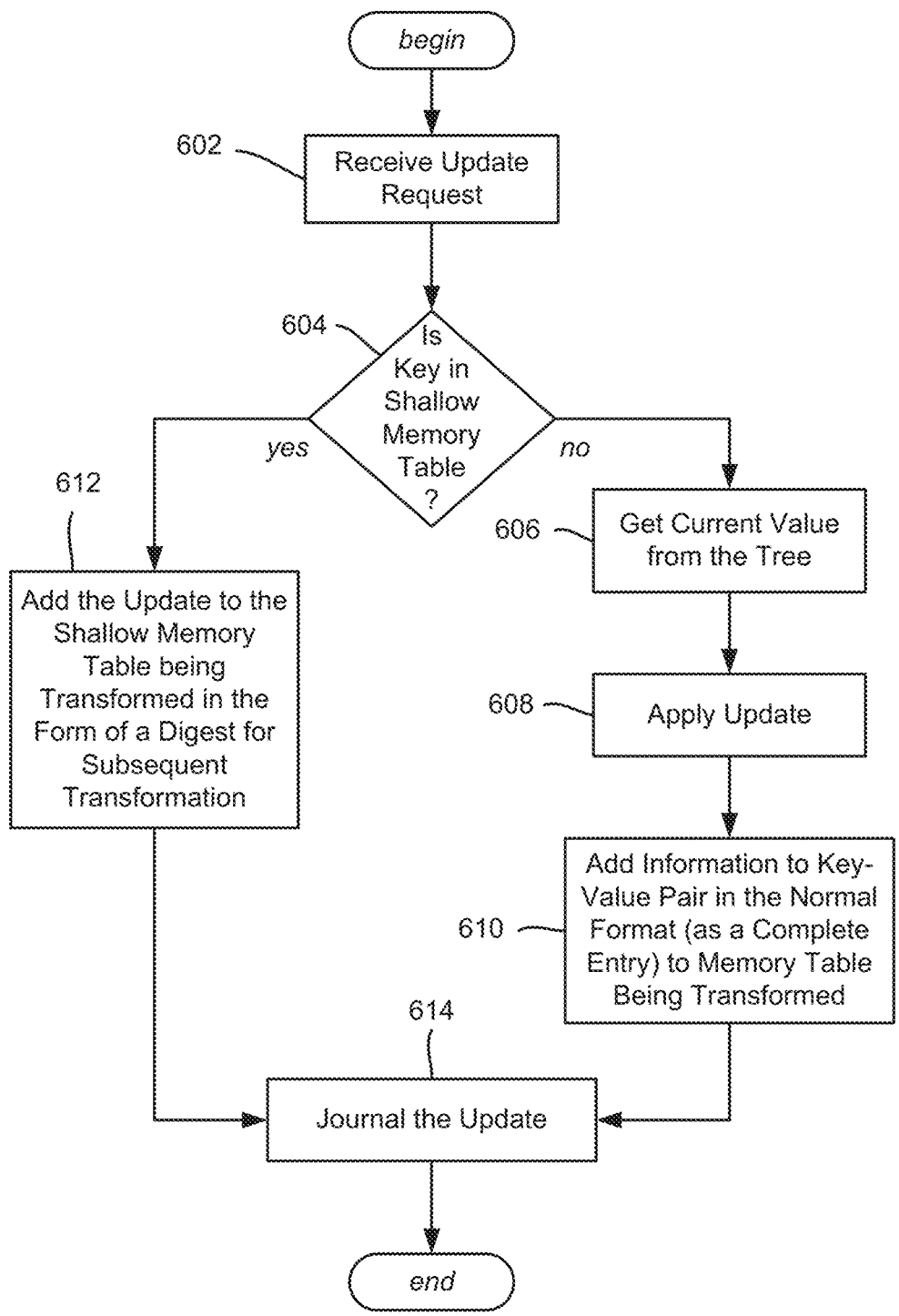
FIG. 6 is a flow diagram showing example operations of a backup node that handles an update request received while transforming a shallow memory table to a regular memory table, in accordance with various aspects and implementations of the subject disclosure.

FIG. 6 represents the handling of update requests, e.g., as received at operation 602. In general, a key corresponding to an update is either in the shallow memory table, or not, as evaluated at operation 604. If not in the shallow memory table, then information about an update is added to the memory table corresponding to that key in the normal format, that is, as a complete entry, not in the form of a digest. To this end, operation 606 reads the value from the tree, if any exists, and operation 608 applies the update as appropriate. Operation 612 adds the updated information to the key-value pair in the normal format (as a complete entry) to the shallow memory table being transformed into the memory table.

If instead at operation 606 the key for this update is in a shallow memory table, operation 612 adds the update to the shallow memory table being transformed in the form of a digest for subsequent transformation. Note that while feasible to add information about an update in the normal format while other updates exist in the form of digests appears as being inconsistent; moreover, the transformation of the other digests to the normal format may take too much time. Thus, in one or more implementations, the update to the memory table is in the form of a digest, whereby that digest along with other digests will be later handled as part of the shallow memory table to normal memory table transformation.

Note that operation 614 journals the update, which in general can occur before other update-related operations in the example of FIG. 6, or generally in parallel with them. Further note that the user data that can accompany an update goes directly to the repository chunk(s); because chunks are immutable, such updates go to new storage locations.

Figure 7:
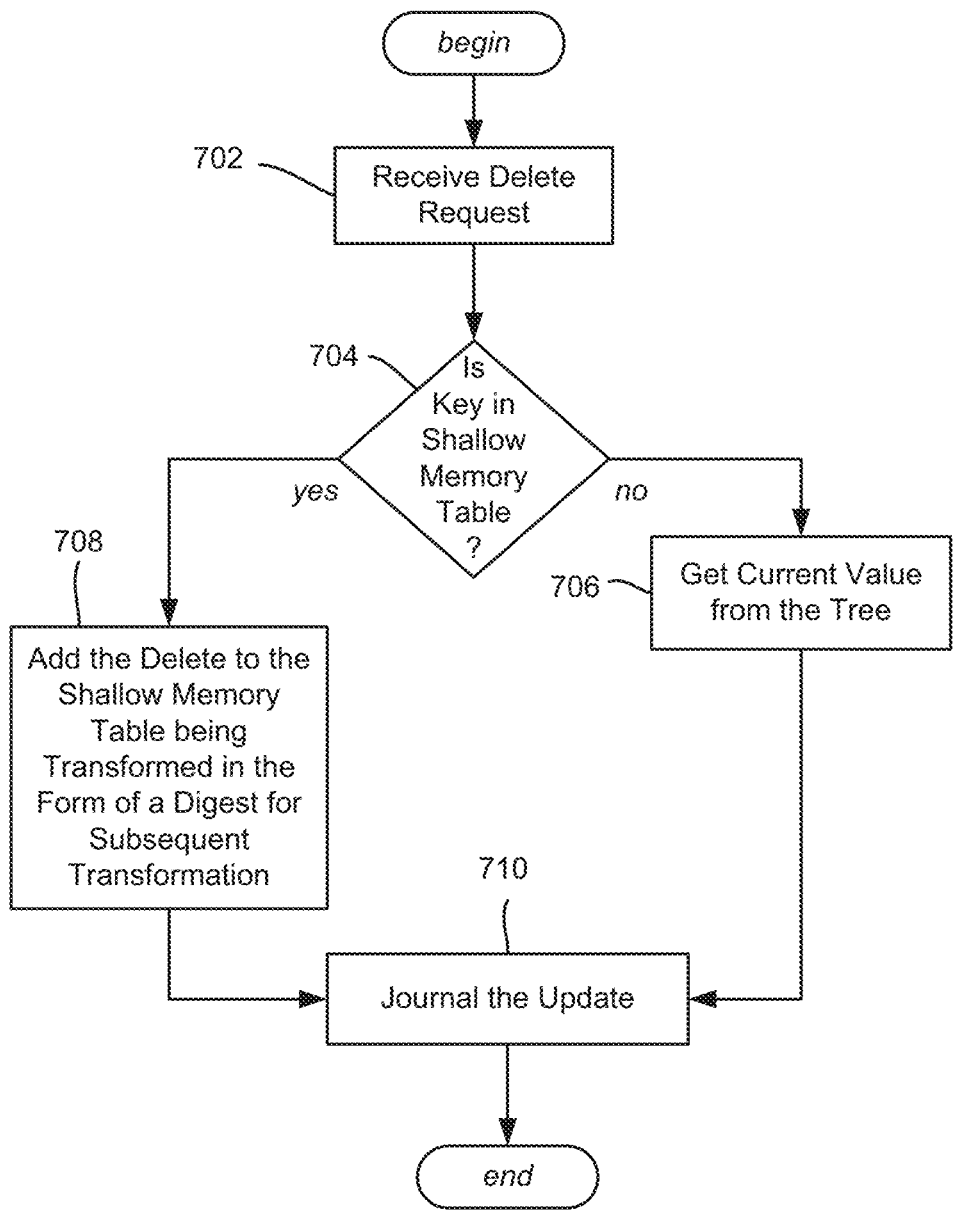
FIG. 7 is a flow diagram showing example operations of a backup node that handles a delete request received while transforming a shallow memory table to a regular memory table, in accordance with various aspects and implementations of the subject disclosure.

FIG. 7 exemplifies the handling of a delete request, received at example operation 702. If at operation 704 a key is not in a shallow memory table, at operation 706 the memory table adds information related to the delete request in the normal format, that is, as a delete marker, not in the form of a digest. Conversely, if at operation 704 a key is in a shallow memory table, the delete request is added to the memory table in the form of a digest. As such, that digest along with other digests will be later handled as part of the shallow memory table to normal memory table transformation.

Turning to another aspect, consistency between a memory table of full value and the corresponding shallow memory table "copy" needs to be guaranteed. More particularly, when a node (e.g., node A 102) that owns a main memory table goes down, the backup node (e.g., node B 104) with the shallow memory table needs to report the values node A would report, or, in exceptional cases, not report at all, that is, return an error.

One way to assure consistency between memory tables is to update a shallow table in frames of a transaction that updates a main memory table. In other words, the transaction is not complete until it is guaranteed that both memory tables have been updated. A transaction fails if it is not guaranteed that a shallow memory table has been updated. Retries can be used to make the transaction solution more robust. While the transaction solution covers a very high percentage of consistency, it is not entirely sufficient. More particularly, at times it is not clear whether a shallow memory table has been updated or not. There is a need for some kind of a consensus algorithm for two memory tables. General purpose consensus algorithms are not an option, as they are too slow.

Figure 8:
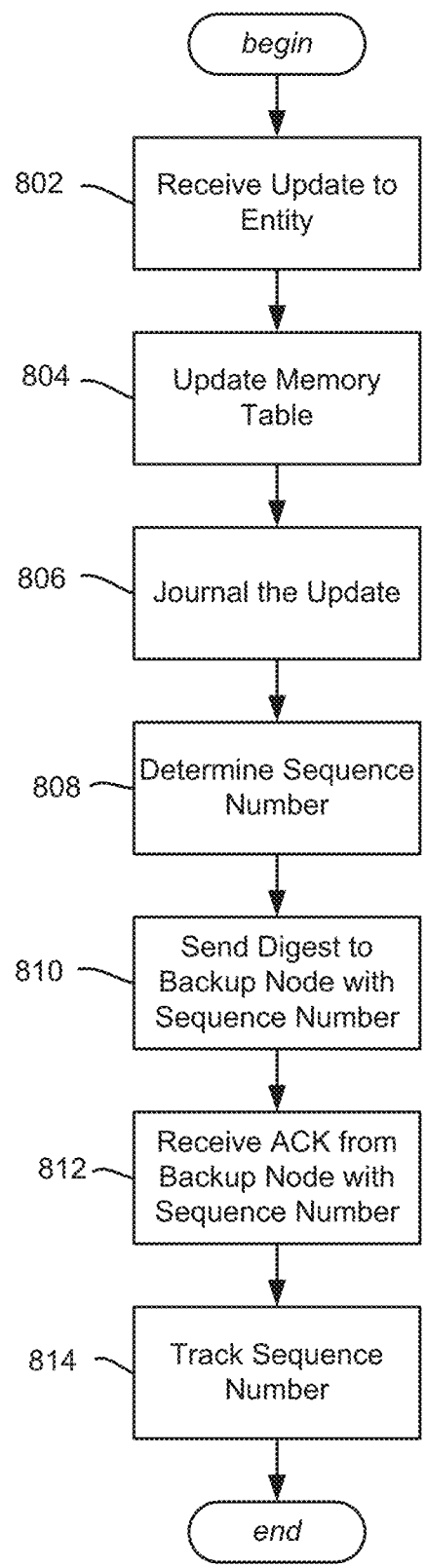
FIG. 8 is a flow diagram showing example operations of a main node that handles a request related to updating an entity, in accordance with various aspects and implementations of the subject disclosure.

Described herein is a lightweight acknowledgement-based device (e.g., the sequence number SN device within the storage service 106 of FIG. 1) that achieves a consensus about past events. Using the components of FIG. 1 and the example operations of FIG. 8, when an update to an entity is received (operation 802), the memory table is updated and the update journaled (operations 804 and 806). Via operations 808 and 810, a sequence number is assigned to each update digest that the node 102 with the main memory table 110 sends to the backup node 104 with a shallow memory table 118.

Figure 9:
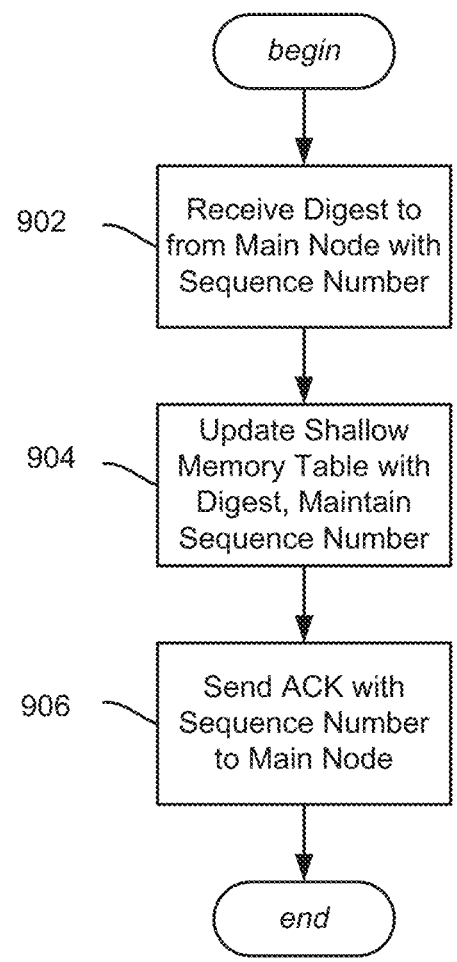
FIG. 9 is a flow diagram showing example operations of a backup node that handles a digest sent from a main node related to updating an entity by using a shallow memory table for the digest, in accordance with various aspects and implementations of the subject disclosure.

As represented in FIG. 9, when the backup node 104 receives an update digest (operation 902), the backup node updates the shallow memory table 118 (operation 904) and maintains the sequence number. Note that a sequence number is a part of each update digest request, and the backup node 104 with a shallow memory table remembers this value. At operation 906 the backup node 104 acknowledges the update digest, with the acknowledgment returned using a corresponding sequence number.

Returning to FIG. 8, at operations 812 and 814 the main node A 102 receives the acknowledgment and tracks the sequence numbers received. In general, the main remembers the greatest sequence number received in a row (N). Therefore, there is a consensus between two nodes that any updates with sequence numbers<=N exist in both memory tables.

When a node with a main memory table goes down, a node with a shallow table reports values for keys having sequence numbers<=N that are not a part of the shallow table, and reports updates for a key having sequence numbers<=N. As for reporting values for other keys, such reporting is postponed until transformation of the memory table is completed. Note that it is expected that there are relatively few such keys in a system (in contrast to contemporary systems that fail to report values on the order of millions or billions of keys).

Figure 10:
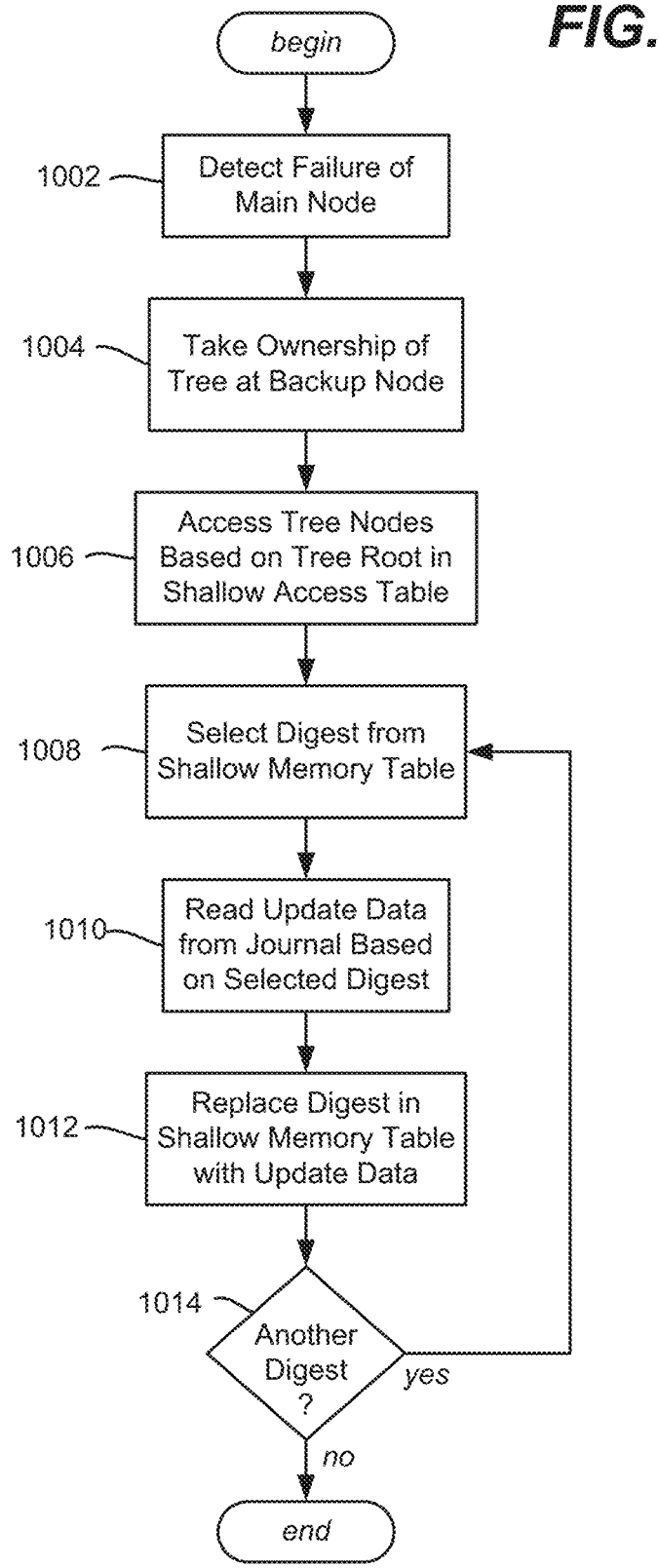
FIG. 10 is a flow diagram showing example operations of a backup node that transforms a shallow memory table into a memory table of full value, in accordance with various aspects and implementations of the subject disclosure.

FIG. 10 summarizes some example backup node transformation operations, beginning at operation 1002 where failure of the main node is detected. Operation 1004 represents the backup node taking ownership of the tree.

At operation 1006, the node uses the tree root it has to get access to tree nodes and key-value pairs the tree contains. Via operations 1008, 1010, 1012 and 1014, the backup node iterates over the update digests the shallow memory table contains, reads each update from the journal, and replaces digests with actual update information. Once no digests remain, the transformation is complete and what was the shallow memory table is now fully transformed in to a memory table of full value.

Figure 3:
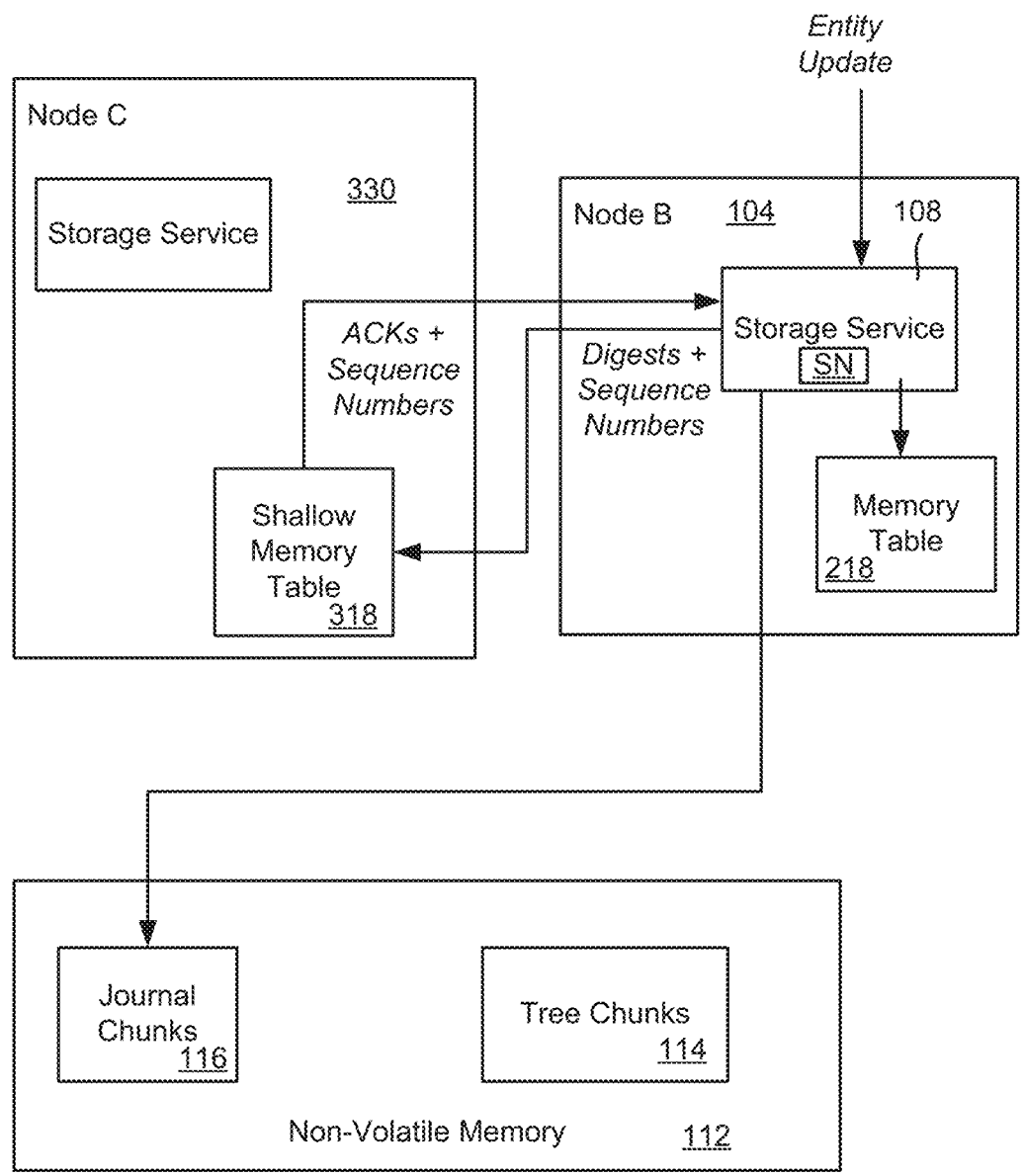
FIG. 3 is an example block diagram representation of part of a data storage system including nodes, in which a backup node takes ownership of a tree previously owned by a failed main node and becomes a new main node with respect to the tree, and a backup node uses a new shallow memory table to back up the main memory table of the new main node, in accordance with various aspects and implementations of the subject disclosure.
Figure 11:
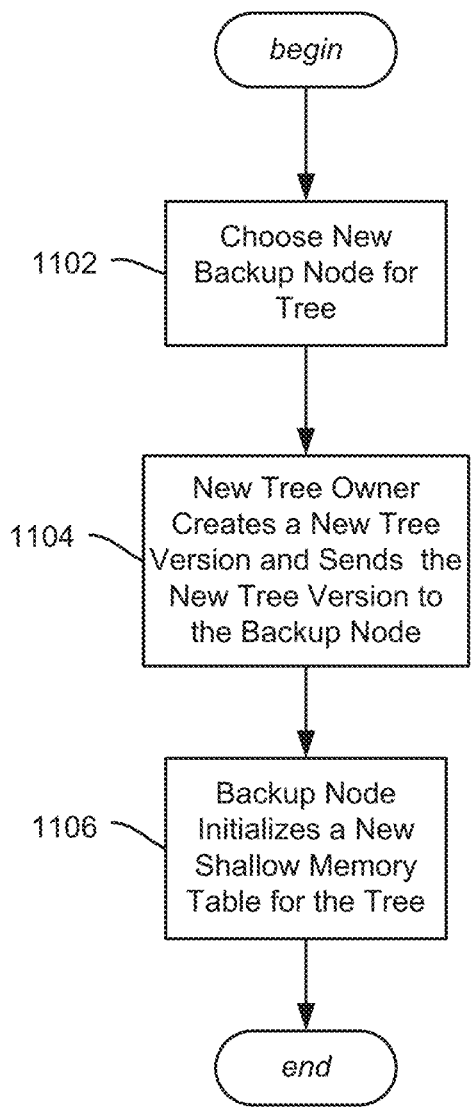
FIG. 11 is a flow diagram showing example operations related to obtaining a new backup node with a new shallow memory table relative to a new main node, in accordance with various aspects and implementations of the subject disclosure.
Figure 12:
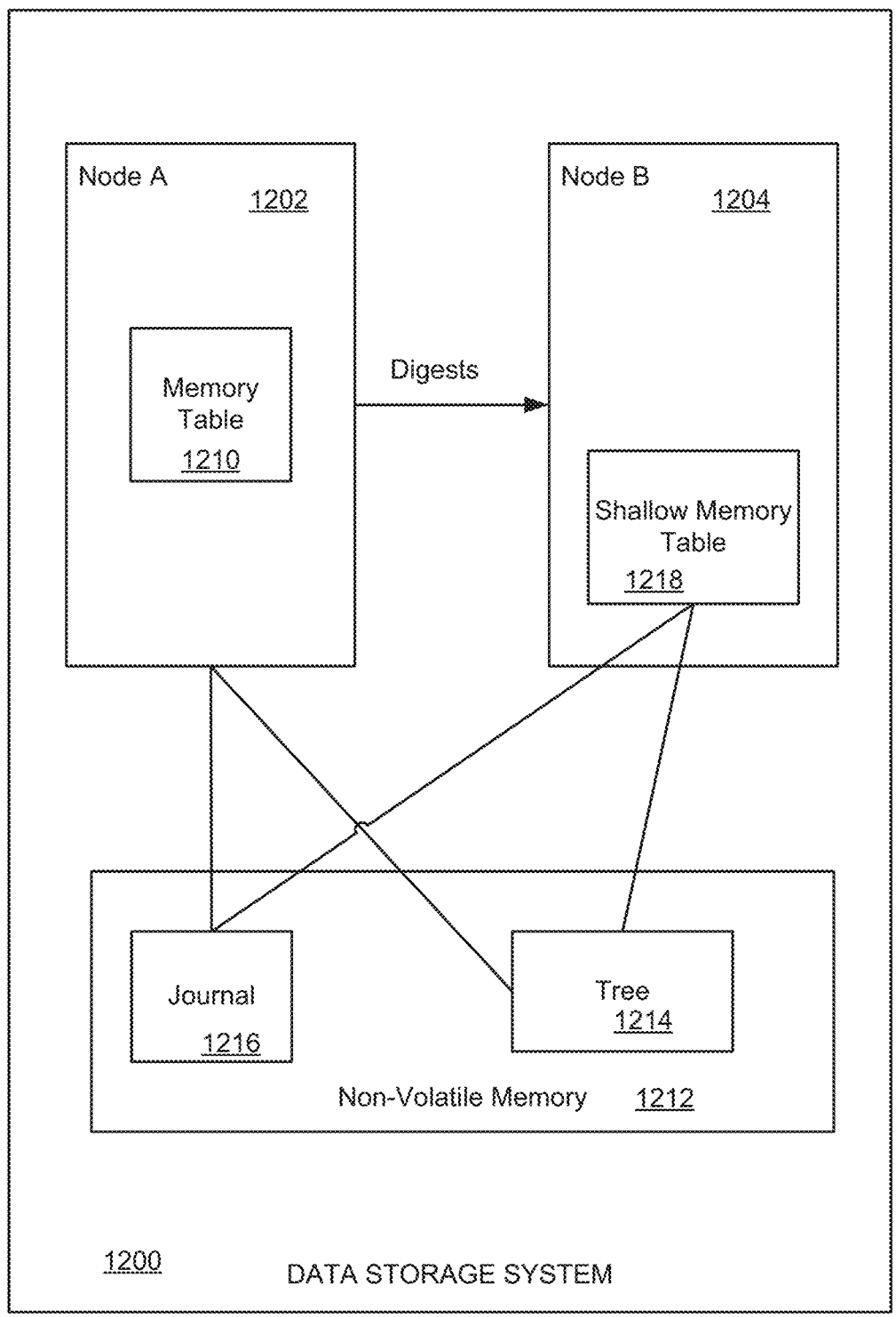
FIG. 12 is an example block diagram showing example components of a data storage system that uses a memory table and a shallow memory table, according to one or more example implementations.

As represented in FIG. 11, once node failure handling is complete a new backup node may be chosen for the tree (operation 1102), e.g., the node 330 (node C) in FIG. 3. Note that the system can negotiate a new owner, or a scheme can be decided in advance such as based on load balancing, and so on. At operation 1104, the new tree owner (the former backup node) creates a new tree version and send it to the new backup node, which initializes a new shallow memory table for the main node memory table as represented by operation 1106.

One or more aspects are represented as a data storage system 1200 comprising nodes 1202 and 1204 can comprise a tree 1214 of entity metadata in non-volatile storage 1212. The system 1200 can comprise a journal of records 1216 corresponding to entity updates applicable to the tree 1214 of entity metadata. A first node 1202 of the nodes maintains a memory table 1210 comprising first information corresponding to a current state of the entity metadata based on the tree 1214 of entity metadata and the journal of the records 1216 corresponding to the entity updates. A second node 1204 of the nodes maintains a shallow memory table 1218 comprising tree identification information that identifies the tree 1214 of entity metadata, and digests comprising second information corresponding to locations of records in the journal of the records 1216, wherein the locations correspond to the entity updates applicable to the tree of entity metadata.

Aspects can comprise a third node of the nodes that maintains a backup shallow memory table for the shallow memory table, e.g., once transformed into another memory table. Other aspects can comprise a sequence number-based acknowledgement device that identifies a consistent update state between the memory table of the first node and the shallow memory table of the second node.

When the first node fails, the second node can access the tree of entity metadata based on the tree identification information, access the digest information to obtain the locations of the records in the journal, and process the shallow memory table into a second memory table based on the tree of entity metadata and further based on first update data in the records in the journal corresponding to the entity updates applicable to the tree of entity metadata.

The second node can process the shallow memory table into the second memory table by processing tree key-digest pairs in the shallow memory table to locate the tree of entity metadata and the records of the journal containing second update data to the entity metadata, to replace update digests in the shallow memory table with the second update data from the records of the journal.

The second node can be configured to serve a create, read, update or delete request related to the tree of entity metadata while the second node processes the shallow memory table into the second memory table.

Figure 13:
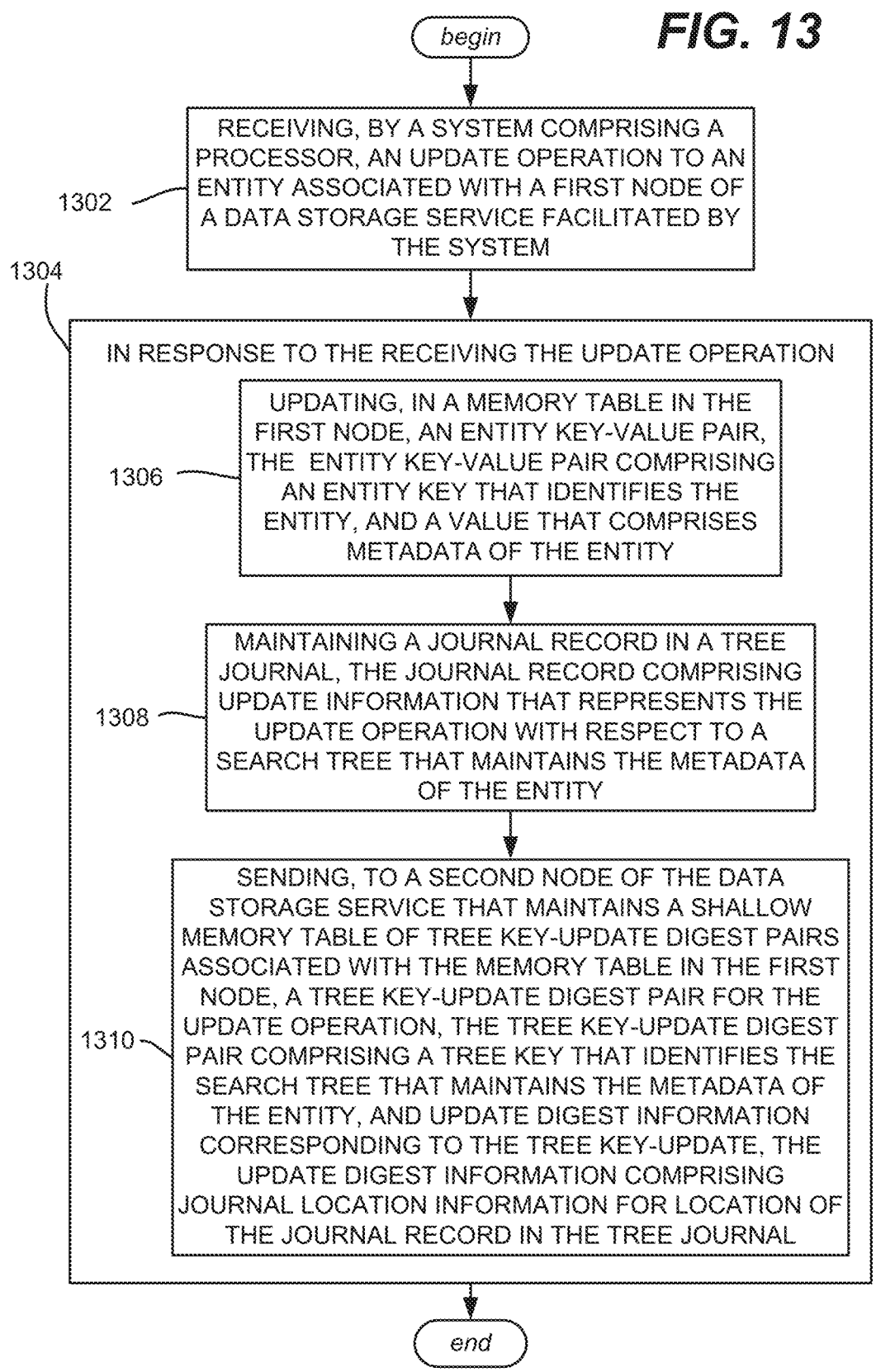
FIG. 13 is an example flow diagram showing example operations related to handling an update at a main node including sending a corresponding update digest to a backup node for maintaining a shallow memory table, according to one or more example implementations.

One or more aspects, generally exemplified in FIG. 13, can comprise operations, e.g., of a method. Operation 1302 represents receiving, by a system comprising a processor, an update operation to an entity associated with a first node of a data storage service facilitated by the system. In response to the receiving the update operation (operation 1304), operation 1306 represents updating, in a memory table in the first node, an entity key-value pair, the entity key-value pair comprising an entity key that identifies the entity, and a value that comprises metadata of the entity. Operation 1308 represents maintaining a journal record in a tree journal, the journal record comprising update information that represents the update operation with respect to a search tree that maintains the metadata of the entity. Operation 1310 represents sending, to a second node of the data storage service that maintains a shallow memory table of tree key-update digest pairs associated with the memory table in the first node, a tree key-update digest pair for the update operation, the tree key-update digest pair comprising a tree key that identifies the search tree that maintains the metadata of the entity, and update digest information corresponding to the tree key-update, the update digest information comprising journal location information for location of the journal record in the tree journal.

Aspects can comprise assigning a sequence number to the tree key-update digest pair, sending the sequence number with the sending the tree key-update digest pair, receiving a copy of the sequence number with an acknowledgment from the second node that acknowledges that the shallow memory table was updated with the tree key-update digest pair, and tracking the sequence number at the first node.

Updating of the memory table of the first node can occur in conjunction with the second node of the data storage service updating, in a transaction, the shallow memory table with the tree key-update digest pair.

The memory table can be a first memory table that contains the entity key-value pair and other entity key-value pairs; aspects can comprise, in response to failure of the first node, processing the tree key-digest pairs in the shallow memory table in the second node to transform the shallow memory table into a second memory table that corresponds to the first memory table.

Processing the tree key-digest pairs in the shallow memory table in the second node can comprise accessing the tree key-update digest pairs in the shallow memory table to locate journal records containing update data, and replacing the update digest information in the shallow memory table with the update data from the journal records.

Aspects can comprise, selecting a third node as a backup node, and sending information from the second node to the third node to facilitate initialization of a second shallow memory table in the third node corresponding to the second memory table in the second node. The can be a first entity; aspects can comprise, during the processing of the tree key-digest pairs in the shallow memory table in the second node to transform the shallow memory table into the second memory table, receiving a create update request with respect to creating a second entity, and in response to the create update request, adding a second entity key-value pair to the second memory table comprising a second entity key that identifies the second entity and a second entity value that comprises location metadata of the second entity that indicates where data of the second entity is stored.

The entity can be a first entity, and aspects can comprise, during the processing of the tree key-digest pairs in the shallow memory table in the second node to transform the shallow memory table into the second memory table, receiving a read request with respect to reading data of a second entity, and in response to the read request, determining whether a second entity key exists in the shallow memory table; further aspects can comprise, in response to no second entity key being determined to exist in the shallow memory table, using the second entity key to access a search tree that maintains metadata for the second entity to obtain the metadata for the second entity and use the metadata to service the read request. Still further aspects can comprise, in response to the second entity key being determined to exist in the shallow memory table, determining whether the second entity key exists in the search tree that maintains the metadata for the second entity, and in response to the second entity key being determined to exist in the search tree, accessing the search tree to obtain a base value comprising metadata from the search tree for the second entity, and accessing the shallow memory table with the shallow memory table key of the second entity to apply one or more updates to the metadata based on digest information associated with the second entity key in the shallow memory table to obtain updated metadata for the second entity and use the updated metadata to service the read request; and in response to no search tree key being determined to exist in the search tree, accessing the shallow memory table with the second entity key to construct metadata based on digest information associated with the second entity key in the shallow memory table and use the metadata to service the read request.

The entity can comprise a first entity, and aspects can comprise, while processing the tree key-digest pairs in the shallow memory table in the second node to transform the shallow memory table into the second memory table, receiving an update request with respect to a second entity, and in response to the update request, determining whether a second entity key exists in the shallow memory table, and in response to no second entity key being determined to exist in the shallow memory table, adding information corresponding the update to the second memory table, and in response to the second entity key being determined to exist in the shallow memory table, adding further digest information, corresponding to the update request to the second entity, to the shallow memory table being transformed into the second memory table.

Aspects can comprise, maintaining tree root data corresponding to the search tree in the shallow memory table, receiving new tree root data from the first node based on the first node having created a new version of the search tree, and in response to the receiving the new tree root data, clearing the tree key-digest updates from the shallow memory table and maintaining the new tree root data in the shallow memory table.

Figure 14:
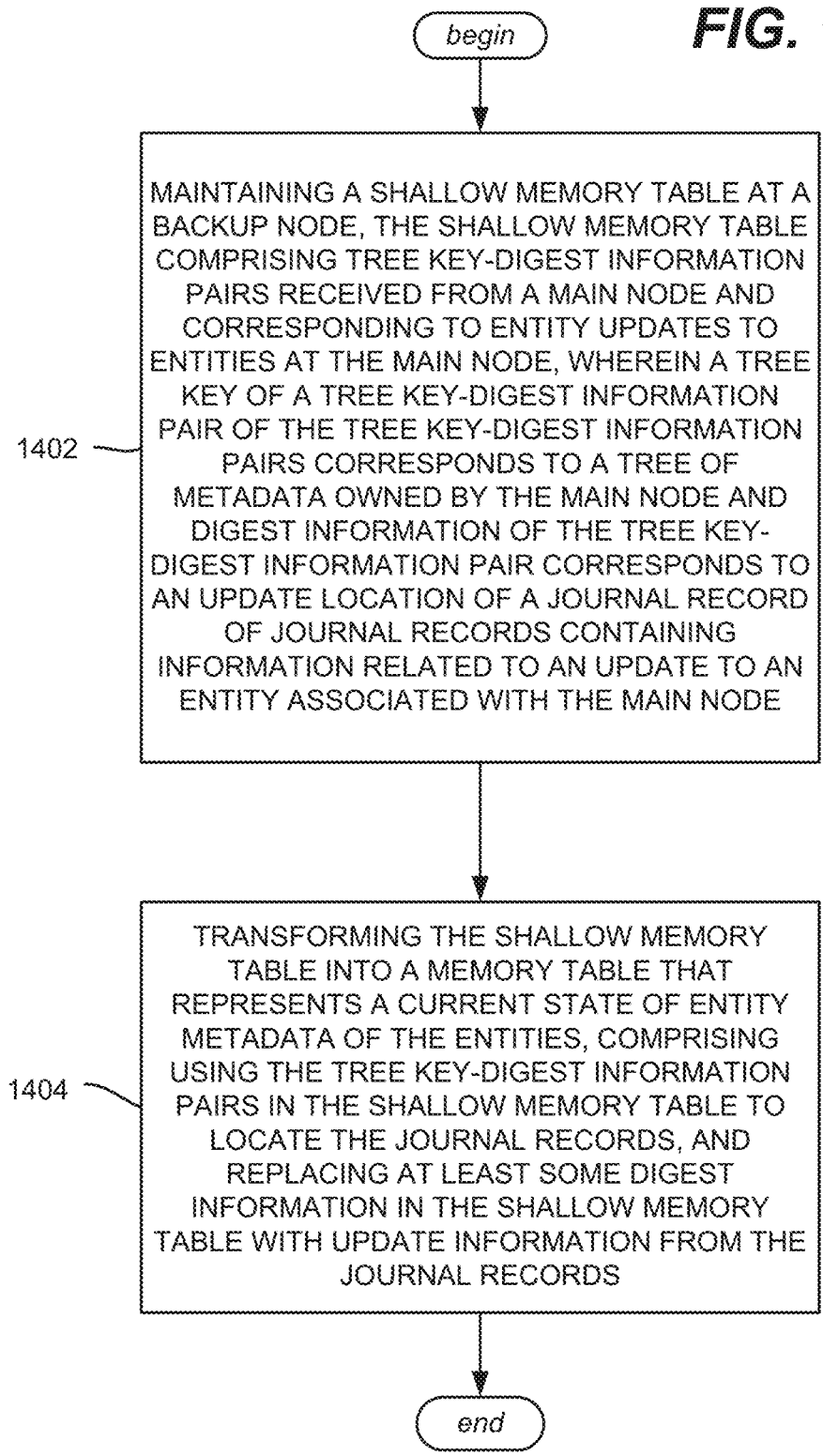
FIG. 14 is an example flow diagram showing example operations related to maintaining a shallow memory table at a backup node, and transforming the shallow memory table into a memory table, according to one or more example implementations.

One or more aspects, such as implemented in a machine-readable storage medium, comprising executable instructions that, when executed by a processor, facilitate performance of operations, can be directed towards operations exemplified in FIG. 14. Example operation 1402 represents maintaining a shallow memory table at a backup node, the shallow memory table comprising tree key-digest information pairs received from a main node and corresponding to entity updates to entities at the main node, wherein a tree key of a tree key-digest information pair of the tree key-digest information pairs corresponds to a tree of metadata owned by the main node and digest information of the tree key-digest information pair corresponds to an update location of a journal record of journal records containing information related to an update to an entity associated with the main node. Example operation 1404 represents transforming the shallow memory table into a memory table that represents a current state of entity metadata of the entities, comprising using the tree key-digest information pairs in the shallow memory table to locate the journal records, and replacing at least some digest information in the shallow memory table with update information from the journal records.

Further operations can comprise serving a create, read, update or delete request related to the entity metadata concurrently with the transforming the shallow memory table into the second memory table.

The tree key-digest information pair received from a main node can be accompanied by a sequence number, and further operations can comprise, acknowledging receipt of the tree key-digest information pair received from the main node, comprising returning the sequence number with an acknowledgment reply, and maintaining the sequence number in association with the tree key-digest information pair.

The main node can comprise a first main node that fails, and further operations can comprise taking ownership of the tree of entity metadata to change the backup node to a second main node that maintains the second memory table, receiving an update operation to an entity associated with the second main node, and in response to the receiving the update operation, updating the second memory table with an entity key-value pair comprising an entity key that identifies the entity, and a value that comprises metadata of the entity, maintaining a journal record in a tree journal, the journal record comprising update information that represents the update operation with respect to the tree of entity metadata, and sending, to a third node that maintains a backup shallow memory table of tree key-update digest pairs associated with the memory table in the second main node, a tree key-update digest pair for the update operation, the tree key-update digest pair comprising a tree key that identifies the tree of entity metadata, and update the at least some of the digest information corresponding to the update of the tree of entity metadata, the update digest information comprising journal location information for location of the journal record in the tree journal.

As can be seen, described herein is a technology that provides shallow memory tables, which helps to solve the problem of low system availability during node failure handling, yet without causing any impact on data storage systems while such systems operating in normal conditions. The technology is practical to implement, as significant extra memory is not needed, yet create, read, update and delete requests can continue to be served while node failure handling is occurring.

Figure 15:
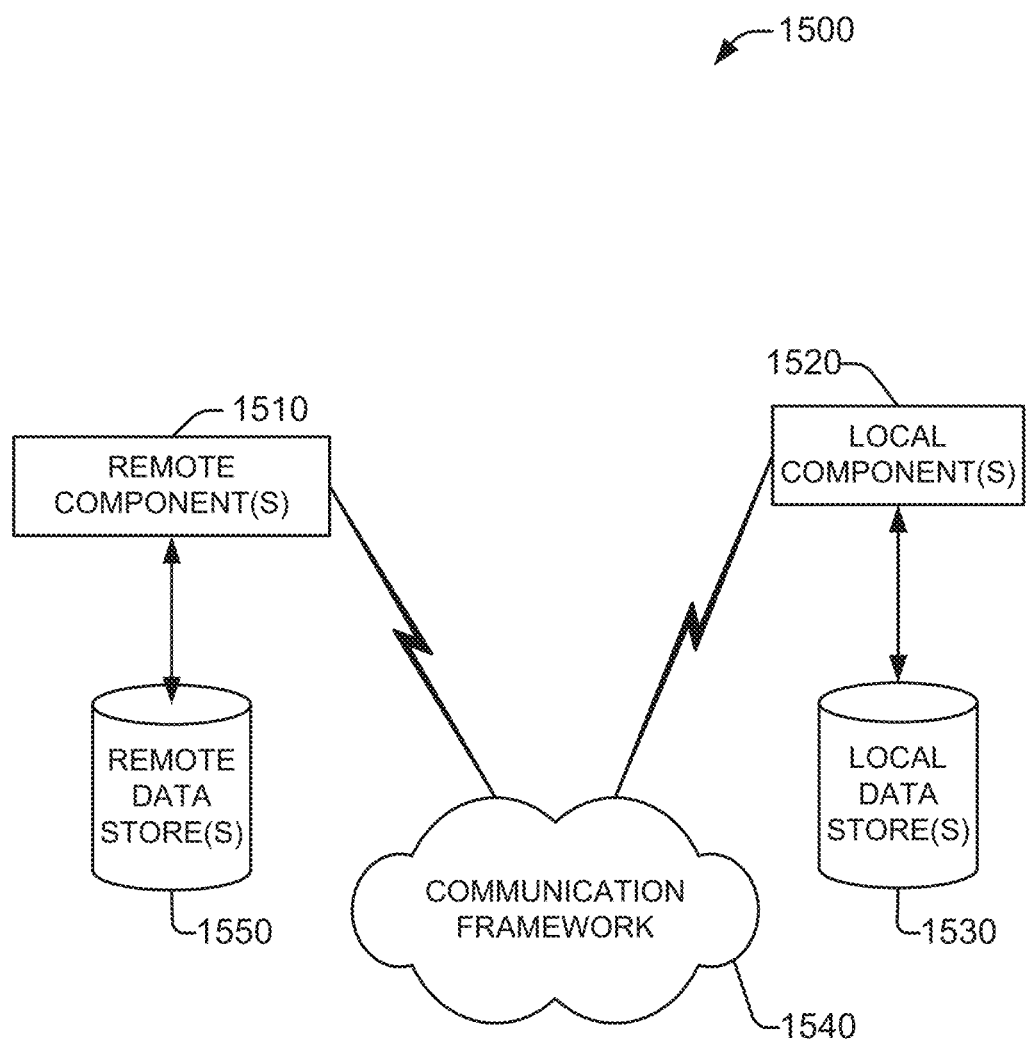
FIG. 15 depicts an example schematic block diagram of a computing environment with which the disclosed subject matter can interact, in accordance with various aspects and implementations of the subject disclosure.

FIG. 15 is a schematic block diagram of a computing environment 1500 with which the disclosed subject matter can interact. The system 1500 comprises one or more remote component(s) 1510. The remote component(s) 1510 can be hardware and/or software (e.g., threads, processes, computing devices). In some embodiments, remote component(s) 1510 can be a distributed computer system, connected to a local automatic scaling component and/or programs that use the resources of a distributed computer system, via communication framework 1540. Communication framework 1540 can comprise wired network devices, wireless network devices, mobile devices, wearable devices, radio access network devices, gateway devices, femtocell devices, servers, etc.

The system 1500 also comprises one or more local component(s) 1520. The local component(s) 1520 can be hardware and/or software (e.g., threads, processes, computing devices). In some embodiments, local component(s) 1520 can comprise an automatic scaling component and/or programs that communicate/use the remote resources 1510 and 1520, etc., connected to a remotely located distributed computing system via communication framework 1540.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The system 1500 comprises a communication framework 1540 that can be employed to facilitate communications between the remote component(s) 1510 and the local component(s) 1520, and can comprise an air interface, e.g., Uu interface of a UMTS network, via a long-term evolution (LTE) network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

Figure 16:
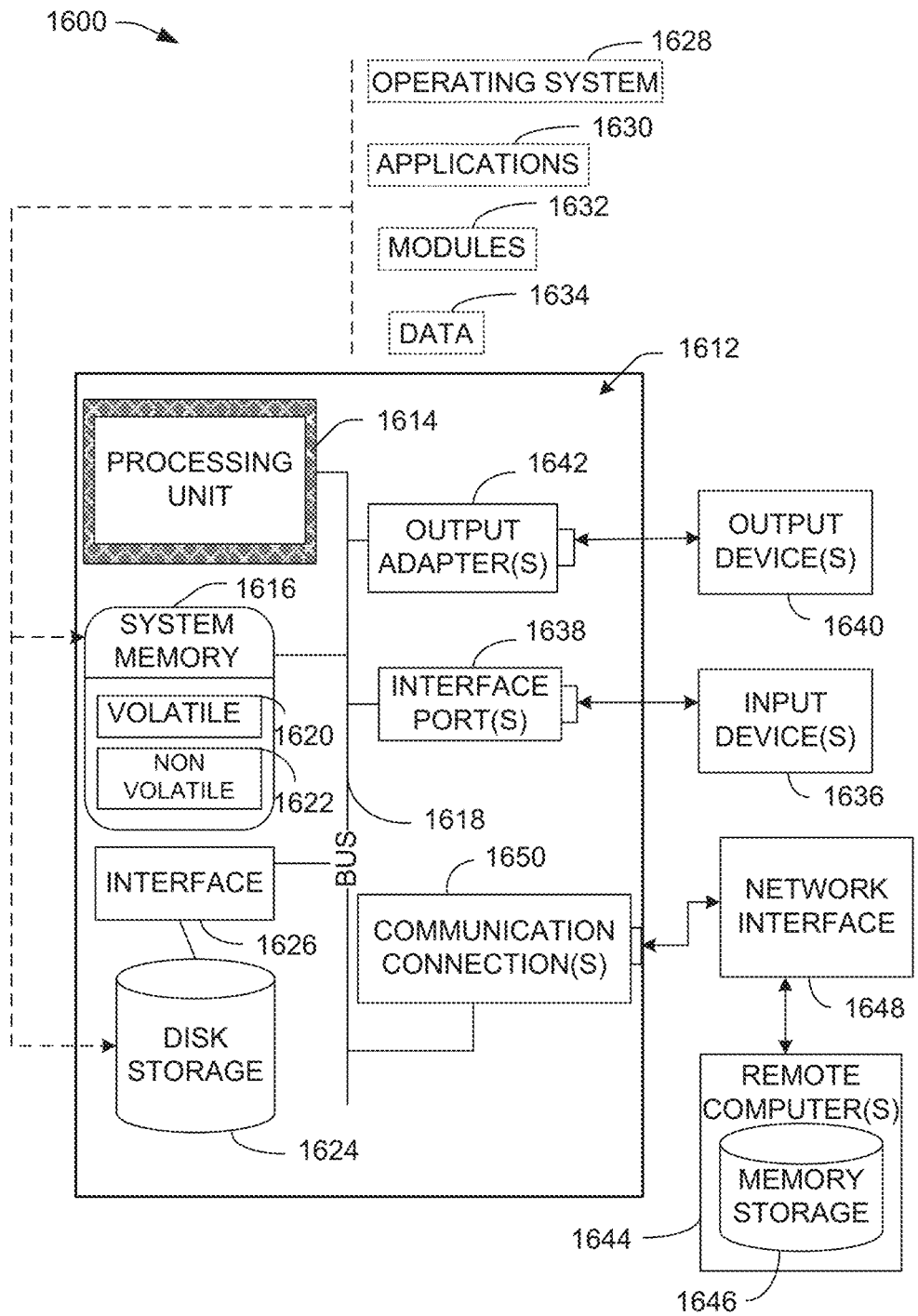
FIG. 16 illustrates an example block diagram of a computing system operable to execute the disclosed systems and methods in accordance with various aspects and implementations of the subject disclosure.

In order to provide a context for the various aspects of the disclosed subject matter, FIG. 16, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1620 (see below), nonvolatile memory 1622 (see below), disk storage 1624 (see below), and memory storage 1646 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 16 illustrates a block diagram of a computing system 1600 operable to execute the disclosed systems and methods in accordance with one or more embodiments/implementations described herein. Computer 1612, can comprise a processing unit 1614, a system memory 1616, and a system bus 1618. System bus 1618 couples system components comprising, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1594), and small computer systems interface.

System memory 1616 can comprise volatile memory 1620 and nonvolatile memory 1622. A basic input/output system, containing routines to transfer information between elements within computer 1612, such as during start-up, can be stored in nonvolatile memory 1622. By way of illustration, and not limitation, nonvolatile memory 1622 can comprise read only memory, programmable read only memory, electrically programmable read only memory, electrically erasable read only memory, or flash memory. Volatile memory 1620 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1612 can also comprise removable/non-removable, volatile/non-volatile computer storage media. FIG. 16 illustrates, for example, disk storage 1624. Disk storage 1624 comprises, but is not limited to, devices like a magnetic disk drive, floppy disk drive, tape drive, flash memory card, or memory stick. In addition, disk storage 1624 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1624 to system bus 1618, a removable or non-removable interface is typically used, such as interface 1626.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 16 describes software that acts as an intermediary between users and computer resources described in suitable operating environment 1600. Such software comprises an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be noted that the disclosed subject matter can be implemented with various operating systems or combinations of operating systems.

A user can enter commands or information into computer 1612 through input device(s) 1636. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1612. Input devices 1636 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1614 through system bus 1618 by way of interface port(s) 1638. Interface port(s) 1638 comprise, for example, a serial port, a parallel port, a game port, a universal serial bus, an infrared port, a Bluetooth port, an IP port, or a logical port associated with a wireless service, etc. Output device(s) 1640 use some of the same type of ports as input device(s) 1636.

Thus, for example, a universal serial busport can be used to provide input to computer 1612 and to output information from computer 1612 to an output device 1640. Output adapter 1642 is provided to illustrate that there are some output devices 1640 like monitors, speakers, and printers, among other output devices 1640, which use special adapters. Output adapters 1642 comprise, by way of illustration and not limitation, video and sound cards that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1612. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1646 is illustrated with remote computer(s) 1644. Remote computer(s) 1644 is logically connected to computer 1612 through a network interface 1648 and then physically connected by way of communication connection 1650. Network interface 1648 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A data storage system of nodes, comprising,
a tree of entity metadata in non-volatile storage;
a journal of records corresponding to entity updates applicable to the tree of entity metadata;
a first node of the nodes that maintains a memory table comprising first information corresponding to a current state of the entity metadata based on the tree of entity metadata and the journal of the records corresponding to the entity updates; and
a second node of the nodes that maintains a shallow memory table comprising tree identification information that identifies the tree of entity metadata, and digests comprising second information corresponding to locations of records in the journal of the records, wherein the locations correspond to the entity updates applicable to the tree of entity metadata.

2. The data storage system of claim 1, further comprising, a third node of the nodes that maintains a backup shallow memory table for the shallow memory table.

3. The data storage system of claim 1, further comprising, a sequence number-based acknowledgement device that identifies a consistent update state between the memory table of the first node and the shallow memory table of the second node.

4. The data storage system of claim 1, wherein, when the first node fails, the second node accesses the tree of entity metadata based on the tree identification information, accesses the digest information to obtain the locations of the records in the journal, and processes the shallow memory table into a second memory table based on the tree of entity metadata and further based on first update data in the records in the journal corresponding to the entity updates applicable to the tree of entity metadata.

5. The data storage system of claim 4, wherein the second node processes the shallow memory table into the second memory table by processing tree key-digest pairs in the shallow memory table to locate the tree of entity metadata and the records of the journal containing second update data to the entity metadata, to replace update digests in the shallow memory table with the second update data from the records of the journal.

6. The data storage system of claim 3, wherein the second node is configured to serve a create, read, update or delete request related to the tree of entity metadata while the second node processes the shallow memory table into the second memory table.

7. A method, comprising:
receiving, by a system comprising a processor, an update operation to an entity associated with a first node of a data storage service facilitated by the system; and
in response to the receiving the update operation,
updating, in a memory table in the first node, an entity key-value pair, the entity key-value pair comprising an entity key that identifies the entity, and a value that comprises metadata of the entity;
maintaining a journal record in a tree journal, the journal record comprising update information that represents the update operation with respect to a search tree that maintains the metadata of the entity; and
sending, to a second node of the data storage service that maintains a shallow memory table of tree key-update digest pairs associated with the memory table in the first node, a tree key-update digest pair for the update operation, the tree key-update digest pair comprising a tree key that identifies the search tree that maintains the metadata of the entity, and update digest information corresponding to the tree key-update, the update digest information comprising journal location information for location of the journal record in the tree journal.

8. The method of claim 7, further comprising, assigning a sequence number to the tree key-update digest pair, sending the sequence number with the sending the tree key-update digest pair, receiving a copy of the sequence number with an acknowledgment from the second node that acknowledges that the shallow memory table was updated with the tree key-update digest pair, and tracking the sequence number at the first node.

9. The method of claim 7, wherein the updating of the memory table of the first node occurs in conjunction with the second node of the data storage service updating, in a transaction, the shallow memory table with the tree key-update digest pair.

10. The method of claim 7, wherein the memory table is a first memory table that contains the entity key-value pair and other entity key-value pairs, and further comprising, in response to failure of the first node, processing the tree key-digest pairs in the shallow memory table in the second node to transform the shallow memory table into a second memory table that corresponds to the first memory table.

11. The method of claim 10, wherein the processing the tree key-digest pairs in the shallow memory table in the second node comprises accessing the tree key-update digest pairs in the shallow memory table to locate journal records containing update data, and replacing the update digest information in the shallow memory table with the update data from the journal records.

12. The method of claim 10, further comprising, selecting a third node as a backup node, and sending information from the second node to the third node to facilitate initialization of a second shallow memory table in the third node corresponding to the second memory table in the second node.

13. The method of claim 10, wherein the entity is a first entity, and further comprising, during the processing of the tree key-digest pairs in the shallow memory table in the second node to transform the shallow memory table into the second memory table, receiving a create update request with respect to creating a second entity, and in response to the create update request, adding a second entity key-value pair to the second memory table comprising a second entity key that identifies the second entity and a second entity value that comprises location metadata of the second entity that indicates where data of the second entity is stored.

14. The method of claim 10, wherein the entity is a first entity, and further comprising, during the processing of the tree key-digest pairs in the shallow memory table in the second node to transform the shallow memory table into the second memory table, receiving a read request with respect to reading data of a second entity, and in response to the read request, determining whether a second entity key exists in the shallow memory table, and
(a) in response to no second entity key being determined to exist in the shallow memory table, using the second entity key to access a search tree that maintains metadata for the second entity to obtain the metadata for the second entity and use the metadata to service the read request, and
(b) in response to the second entity key being determined to exist in the shallow memory table, determining whether the second entity key exists in the search tree that maintains the metadata for the second entity, and
(i) in response to the second entity key being determined to exist in the search tree, accessing the search tree to obtain a base value comprising metadata from the search tree for the second entity, and accessing the shallow memory table with the shallow memory table key of the second entity to apply one or more updates to the metadata based on digest information associated with the second entity key in the shallow memory table to obtain updated metadata for the second entity and use the updated metadata to service the read request, and (ii) in response to no search tree key being determined to exist in the search tree, accessing the shallow memory table with the second entity key to construct metadata based on digest information associated with the second entity key in the shallow memory table and use the metadata to service the read request.

15. The method of claim 10, wherein the entity is a first entity, and further comprising, while processing the tree key-digest pairs in the shallow memory table in the second node to transform the shallow memory table into the second memory table, receiving an update request with respect to a second entity, and in response to the update request, determining whether a second entity key exists in the shallow memory table, and in response to no second entity key being determined to exist in the shallow memory table, adding information corresponding the update to the second memory table, and in response to the second entity key being determined to exist in the shallow memory table, adding further digest information, corresponding to the update request to the second entity, to the shallow memory table being transformed into the second memory table.

16. The method of claim 10, further comprising, maintaining tree root data corresponding to the search tree in the shallow memory table, receiving new tree root data from the first node based on the first node having created a new version of the search tree, and in response to the receiving the new tree root data, clearing the tree key-digest updates from the shallow memory table and maintaining the new tree root data in the shallow memory table.

17. A non-transitory machine-readable medium, comprising executable instructions that, when executed by a processor, facilitate performance of operations, the operations comprising:

maintaining a shallow memory table at a backup node, the shallow memory table comprising tree key-digest information pairs received from a main node and corresponding to entity updates to entities at the main node, wherein a tree key of a tree key-digest information pair of the tree key-digest information pairs corresponds to a tree of metadata owned by the main node and digest information of the tree key-digest information pair corresponds to an update location of a journal record of journal records containing information related to an update to an entity associated with the main node; and transforming the shallow memory table into a memory table that represents a current state of entity metadata of the entities, comprising using the tree key-digest information pairs in the shallow memory table to locate the journal records, and replacing at least some digest information in the shallow memory table with update information from the journal records.

18. The non-transitory machine-readable medium of claim 17, wherein the operations further comprise serving a create, read, update or delete request related to the entity metadata concurrently with the transforming the shallow memory table into the second memory table.

19. The non-transitory machine-readable medium of claim 17, wherein the tree key-digest information pair received from a main node is accompanied by a sequence number, and wherein the operations further comprise, acknowledging receipt of the tree key-digest information pair received from the main node, comprising returning the sequence number with an acknowledgment reply, and maintaining the sequence number in association with the tree key-digest information pair.

20. The non-transitory machine-readable medium of claim 17, wherein the main node is a first main node that fails, and wherein the operations further comprise, taking ownership of the tree of entity metadata to change the backup node to a second main node that maintains the second memory table, receiving an update operation to an entity associated with the second main node, and in response to the receiving the update operation, updating the second memory table with an entity key-value pair comprising an entity key that identifies the entity, and a value that comprises metadata of the entity, maintaining a journal record in a tree journal, the journal record comprising update information that represents the update operation with respect to the tree of entity metadata, and sending, to a third node that maintains a backup shallow memory table of tree key-update digest pairs associated with the memory table in the second main node, a tree key-update digest pair for the update operation, the tree key-update digest pair comprising a tree key that identifies the tree of entity metadata, and update the at least some of the digest information corresponding to the update of the tree of entity metadata, the update digest information comprising journal location information for location of the journal record in the tree journal.

* * * * *